April 21, 1970 P. E. OBERG 3,508,226

CONTROLLED MAGNETIC EASY AXIS DISPERSION IN MAGNETIZABLE ELEMENTS

Filed Nov. 29, 1967 3 Sheets-Sheet 1

TYPE I

TYPE II

INVENTOR
PAUL E. OBERG
BY Kenneth T. Grace
ATTORNEY

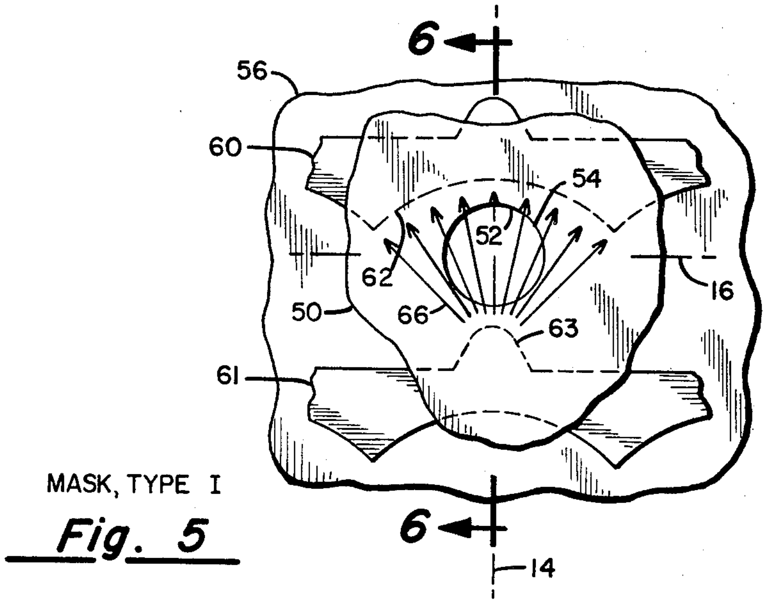
MASK, TYPE I
Fig. 5
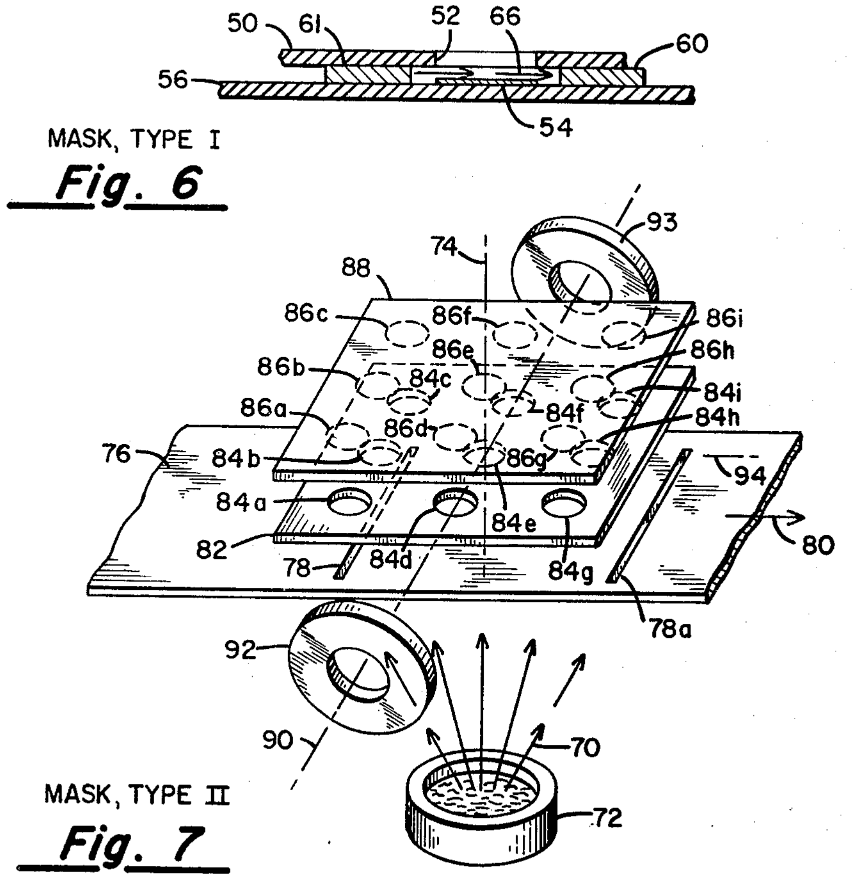
MASK, TYPE I
Fig. 6
MASK, TYPE II
Fig. 7

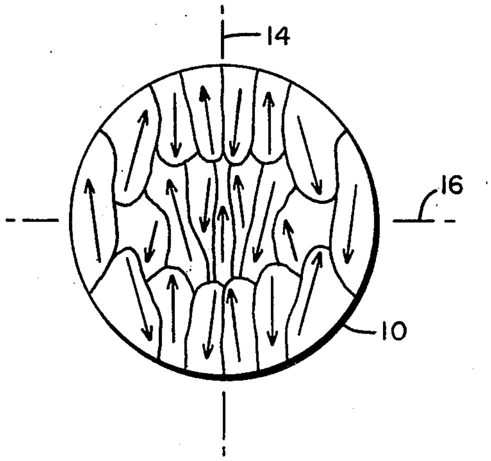
PRIOR ART, DEMAGNETIZED STATE
Fig. 8
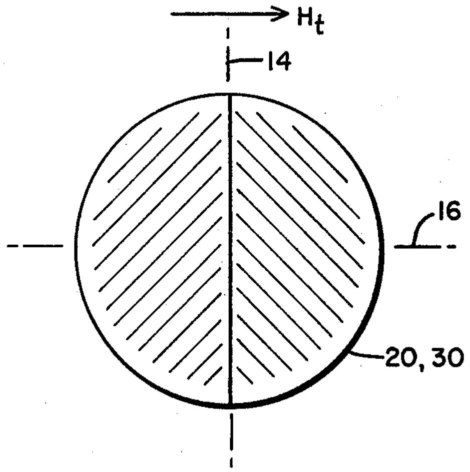
TYPE I & II
DEMAGNETIZED STATE
Fig. 9
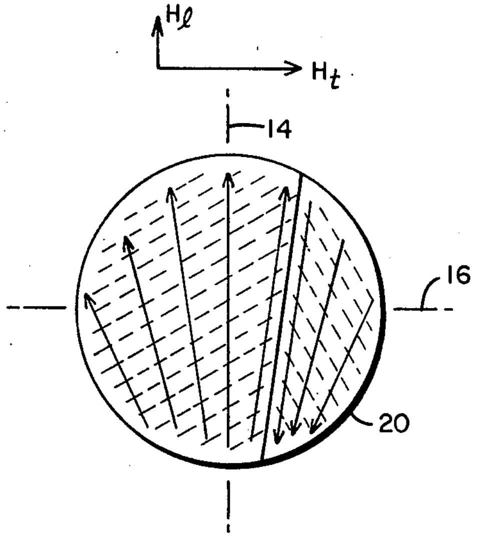
TYPE I
Fig. 10
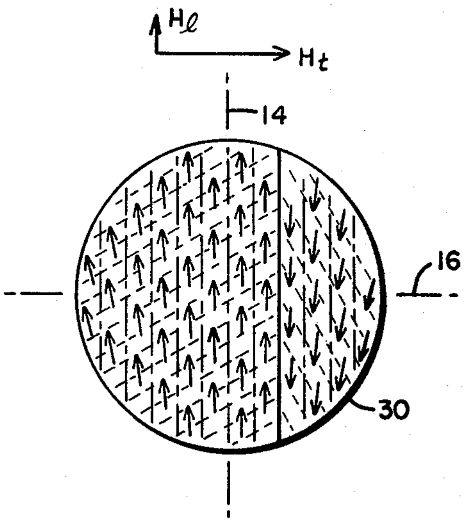
TYPE II
Fig. 11
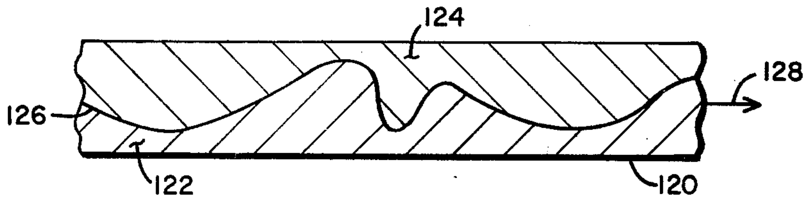
Fig. 12 TYPE I OR II

United States Patent Office 3,508,226

Patented Apr. 21, 1970

3,508,226

CONTROLLED MAGNETIC EASY AXIS DISPERSION IN MAGNETIZABLE ELEMENTS

Paul E. Oberg, Minneapolis, Minn., assignor to Sperry Rand Corporation, New York, N.Y., a corporation of Delaware

Filed Nov. 29, 1967, Ser. No. 686,413

Int. Cl. G11c *11/14*

U.S. Cl. 340—174 2 Claims

ABSTRACT OF THE DISCLOSURE

Methods of and apparatus for producing a magnetizable element having perdetermined varying easy axis dispersion, i.e., magnetic field anisotropy orientation, having a linear or controllable angular dispersion curve over a substantial percentage of its irreversibly switchable magnetization.

BACKGROUND OF THE INVENTION

The present invention relates to the metal treating art and in particular to magnetizable elements having single domain properties and an angular dispersion curve that is linear over a substantial percentage of its irreversibly switchable magnetization. The generation of thin-ferromagnetic-film layers of a magnetizable material having single domain properties is well known in the art. One method being exemplified by the S. M. Rubens Patent No. 2,900,282. Such thin-ferromagnetic-film layers when fabricated in matrix arrays exemplified by the S. M. Rubens et al. Patent No. 3,155,561 and when operated in the domain rotational mode as exemplified by the S. M. Rubens et al. Patent No. 3,030,612 provide highly efficient compact apparatus for the storage of information. Such two-dimensional arrays and their methods of operation in binary memory systems are exemplified by the patent application of R. J. Bergman et al., now Patent No. 3,435,435.

Such thin-ferromagnetic-film layers, due to their extremely fast switching characteristics and their ability to retain, for long time durations and under extreme environmental conditions, their informational content, make ideal storage devices for the recording of analog data. The copending patent application of Robert A. White et al., now Patent No. 3,457,554 provides a novel apparatus for and a method of operation of a thin-ferromagnetic-film layer wherein the layer's angular dispersion curve is utilized to permit the storage of discrete levels of sampled data as a function of the degree of rotation of the layer's magnetization when subjected to coincident longitudinal and transverse drive field switching components. This Robert A. White et al., patent application is concerned with the establishment of a predeterminably variable magnetic flux level in a magnetizable element which flux level is representative of the amplitude of an incremental portion of an analog signal.

In the preferred embodiment of such patent application an incremental portion of an analog signal from a first source is gated into the magnetizable element by a strobe pulse from a second source. The analog signal is coupled to the magnetizable element as a longitudinal drive field component, the maximum intensity of which is limited to a level well below the switching threshold $NI_0$ of the magnetizable element such that the analog signal alone is incapable of affecting the flux level thereof. The strobe pulse is coupled to the magnetizable element as a transverse drive field component and has an intensity sufficient to change the magnetizable element's magnetization to become orthogonal to its easy axis, i.e., along its hard axis. With a magnetizable element possessing the suitable angular dispersion characteristics the longitudinal drive field component produced by the analog signal biases the magnetizable element's magnetization away from such hard axis a degree that is a function of the intensity of the longitudinal drive field. At the particular time that the analog signal amplitude is to be sampled the strobe pulse generated transverse drive field is removed permitting the analog signal to set the magnetization of the magnetizable element into a discrete level of partial switching which level of partial switching is representative of the amplitude of the analog signal at the time of the removal of the transverse drive field. Different incremental portions of the analog signal may be gated into the magnetizable element by the determination of the particular turn-off time of the strobe pulse. Additionally, a plurality of different incremental portions of the analog signal may be gated into a corresponding plurality of different magnetizable elements by delaying the analog signal different time increments with respect to the strobe pulse wherein each different time delayed increment of the transient signal is gated by the strobe pulse into a separate magnetizable element so that each separate magnetizable element stores a flux level that is representative of a different sampled portion of the analog signal.

This patent application of Robert A. White et al., utilizes as the magnetizable element thin-ferromagnetic-film layers that may be fabricated in accordance with the S. M. Rubens Patent No. 2,900,282. These layers preferably have single domain properties and possess the magnetic characteristic of uniaxial anisotropy providing a single average easy axis with normal angular dispersion along which the remanent magnetization thereof lies in a first or a second and opposite direction or in any intermediate partially-switched magnetic state.

The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation. Such layers provide the desired characteristics to function as a detector for sampled portions of an analog signal. However, such layers do have an undesirable shortcoming in that such layers' angular dispersion curve is substantially linear over only about 45 percent of their total irreversibly switchable magnetization. It is highly desirable that there be provided for such analog recording devices thin-ferromagnetic-film layers having the same physical dimensions but being capable of having a linear angular dispersion curve over substantially 100 percent of their irreversibly switchable magnetization. Such layers would, without affecting the physical size of the recording system, permit the sampling of analog signals having maximum amplitudes substantially greater than that of the prior art thin-ferromagnetic-film layers discussed in the patent application of Robert A. White et al., and would allow more different discrete magnetic states to be stored in each layer.

SUMMARY OF THE INVENTION

The present invention relates to methods and apparatus for producing thin-ferromagnetic-film layers having an angular dispersion curve that is linear over substantially 100 percent of their irreversibly switchable magnetization.

Layers having such desirable characteristics are disclosed in the present specification as being of two preferred types: Type I in which the easy axis distribution, i.e., the magnetic field anisotropy orientation, is substantially symmetrical about a central axis and is substantially constantly angularly varying away from such central axis. Type II in which the easy axis distribution is substantially symmetrical about the central axis, is substantially angularly constant throughout strips parallel to such central axis and which angularly constant easy axis in each strip is substantially varying in adjacent strips away from such central axis. Accordingly, it is a primary object of the present invention to provide an improved thin-ferromagnetic-film layer having an angular dispersion curve that is substantially linear over substantially 100 percent of its irreversibly switchable magnetization.

BRIEF DESCRIPTION OF THE DRAWINGS

FIG. 5 is an illustration one method of generating thin-ferromagnetic-film layers having Type I dispersion characteristics of the present invention.

FIG. 6 is an illustration of a cross section of the arrangement of FIG. 5 taken along axis 6—6.

FIG. 7 is an illustration of one method of generating thin-ferromagnetic-film layers having Type II dispersion characteristics of the present invention.

FIG. 8 is a schematic illustration of the demagnetized domain orientation of a thin-ferromagnetic-film layer having a prior-art single average easy axis $M_a$.

FIG. 9 is a schematic illustration of the demagnetized domain orientation of a thin-ferromagnetic-film layer having Type I or Type II dispersion characteristics of the present invention.

FIG. 10 is a schematic illustration of the domain orientation of a Type I thin-ferromagnetic-film layer for a stored analog signal representing plus 30 percent of the irreversible switching flux.

FIG. 11 is a schematic illustration of the domain orientation of a Type II thin-ferromagnetic-film layer for a stored analog signal representing plus 30 percent of the irreversible switching flux.

FIG. 12 is a schematic illustration of the domain orientation of a magnetic tape having the Type I or Type II dispersion characteristic of the present invention.

DESCRIPTION OF THE PREFERRED EMBODIMENT

Figure 1:
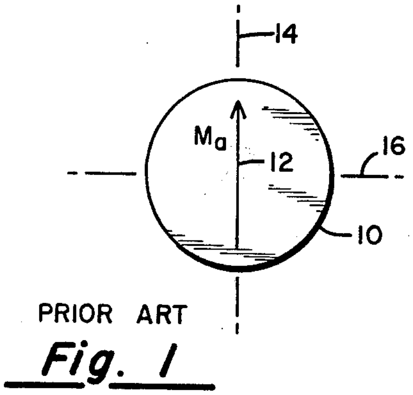
FIG. 1 is an illustration of a prior art thin-ferromagnetic-film layer having a single means easy axis $M_a$.

With particular reference to FIG. 1 there is presented an illustration of a prior art thin-ferromagnetic-film layer 10 having a single average easy axis $M_a$ 12 along which the remanent magnetization thereof may be aligned in a first or in a second and opposite direction. For purposes of orienting the thin-ferromagnetic-film layers, their associated magnetic characteristics and any associated apparatus there are provided two orthogonally oriented axes 14 and 16. With respect to the prior art thin-ferromagnetic-film layer 10, axis 14 is parallel to the single average easy axis 12, defined as the easy axis $M_a$, and axis 16 is aligned perpendicular to such easy axis 12 or parallel to the hard axis thereof. When layer 10, by any one of many well known techniques, is affected by a magnetic drive field oriented parallel to axis 14, which drive field is defined as a longitudinal drive field $H_l$, the magnetization thereof is aligned in a first or a second and opposite direction (except for a few small free poles that exist at the periphery of element 10 in the vicinity of axis 14) and is substantially one large single domain. Additionally, when element 10, by any one of many well known techniques, is affected by a magnetic drive field $H_t \geq H_k$ oriented parallel to axis 16, which magnetic drive field is defined as a transverse drive field $H_t$, the magnetization thereof may be established into a substantially demagnetized state.

The utilization of layer 10 as an analog storage device is described in detail in the hereinabove discussed patent application of Robert A. White et al. This Robert A. White et al. patent application is concerned with the establishment of a predeterminably variable magnetic flux level in a magnetizable element, such as layer 10, which flux level is representative of the amplitude of an incremental portion of an analog signal. In a preferred embodiment of such an analog storage device an incremental portion of an analog signal from a first source is gated into the magnetizable element by a strobe pulse from a second source. The analog signal is coupled to the magnetizable element as a longitudinal drive field $H_l$ component, the maximum intensity of which is limited to a level well below the switching threshold $NI_0$ of the magnetizable element such that the analog signal alone is incapable of affecting the flux level thereof. The strobe pulse is coupled to the magnetizable element as a transverse drive field $H_t$ component and has an intensity $H_t \geq H_k$ sufficient to rotate the magnetizable element's magnetization orthogonal to its easy axis 12, i.e., along axis 16. With a magnetizable element 10 possessing normal angular dispersion characteristics the longitudinal drive field component produced by the analog signal biases the magnetizable element's magnetization away from such hard axis 16 a degree that is a function of the intensity of the applied longitudinal drive field. See the publication, "Flux Reversal by Non-coherent Rotation in Magnetic Films," K. J. Harte, Journal of Applied Physics, Supplement, volume 31, No. 5, pp. 2835–2845, May, 1960. At the particular time that the analog signal is to be sampled the strobe pulse generated transverse drive field is removed permitting the analog signal to set the magnetization of the magnetizable element into a discrete level of partial switching, which level of partial switching is representative of the amplitude of the analog signal at the time of the removal of the transverse drive field. Alternatively, if a transverse drive field $H_t$ having an intensity sufficient to rotate the magnetizable element's magnetization along its hard axis 16, i.e., equal to or greater than the anisotropy field $H_k$ of the layer 10, the magnetizable element's magnetization upon the sudden removal of the transverse drive field $H_t$ collapses about the hard axis 16 in a random manner achieving a substantially demagnetized state.

Figure 2:
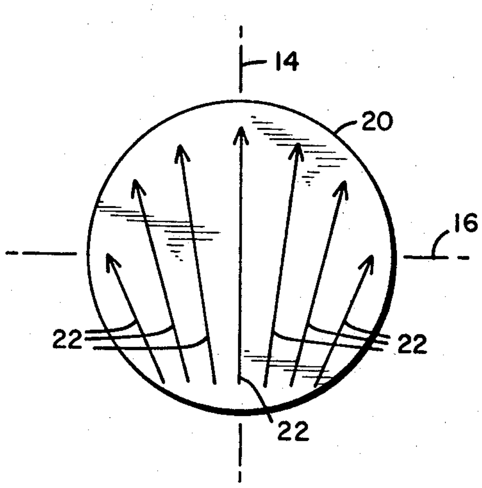
FIG. 2 is an illustration of the easy axis dispersion in a Type I thin-ferromagnetic-film layer of the present invention.

With particular reference to FIG. 2 there is presented an illustration of the easy axis dispersion in a Type I thin-ferromagnetic-film layer 20 of the present invention. In the Type I easy axis dispersion of layer 20 the easy axis distribution is substantially symmetrical about central axis 14 and is substantially constantly angularly varying away from such central axis 14. The radially extending easy axes of the Type I easy axis dispersion of layer 20 are schematically represented by vectors 22, it being understood that such magnetization vectors 22 are merely illustrative of the magnetic orientation of layer 20 throughout its planar surface. Further, it is to be understood that such magnetization orientation is substantially constantly angularly varying away from central axis 14, such vectors 22 merely indicating the gross magnetization orientation throughout the planar surface of layer 20.

Figure 3:
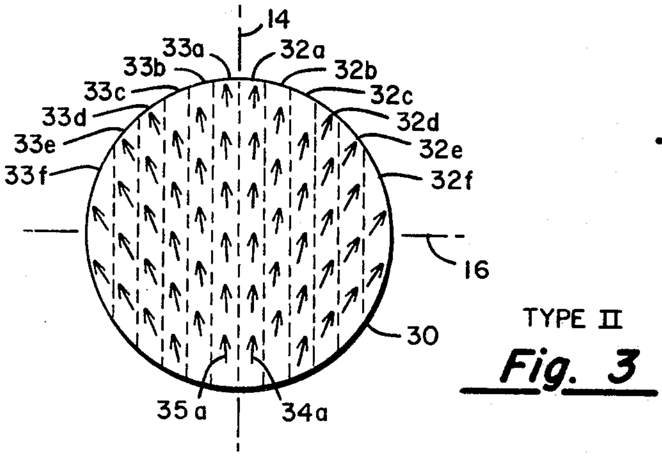
FIG. 3 is an illustration of the easy axis dispersion in a Type II thin-ferromagnetic-film layer of the present invention.

With particular reference to FIG. 3 there is presented an illustration of the easy axis dispersion in a Type II thin-ferromagnetic-film layer 30 of the present invention. In the Type II easy axis dispersion illustrated in FIG. 3 the easy axis distribution is substantially symmetrical about the central axis 14, is substantially angularly constant throughout each of a plurality of strips 32, 33 that are parallel to such central axis 14 and which angularly constant easy axis in each strip 32, 33 is substantially angularly varying in adjacent strips 32, 33 moving away from such central axis 14. In this Type II easy axis dispersion of layer 30 the magnetization thereof is oriented in a plurality of strips 32, 33, the magnetization throughout each strip 32, 33 is oriented at a substantially constant angle with respect to the central axis 14, the orientation of the magnetization in each of the strips 32, 33 is as exemplified by the associated magnetic vectors 34, 35. In other words, the magnetization of each of strips 32, 33 are each of substantially one large magnetic domain aligned in a direction exemplified by the associated vectors 34, 35.

With the magnetization of adjacent strips 32, 33 each being in a different angular orientation with respect to the central axis 14, adjacent strips 32, 33 are separated by magnetic domain walls, of either the Néel or the Bloch type, which due to the preferred orientation of the magnetization in strips 32, 33 are substantially fixed in a spatial relationship defining the boundaries between adjacent strips 32, 33. It is to be appreciated that the magnetic vectors 34, 35 associated with strips 32, 33, respectively, are merely provided, as with respect to FIG. 2, to illustrate the particular easy axis orientation associated with each associated strip 32, 33 and to illustrate the manner in which the easy axis orientation in each strip 32, 33, although uniform throughout each strip 32, 33, varies in increasing angular relationship with respect to central axis 14 as each strip 32, 33 is removed from such central axis 14. Further, it is to be appreciated that although there are illustrated only 6 strips 32, and 6 strips 33 on opposite sides of the central axis 14 such as not to be construed as limitation of the number of strips, each of a substantially constant magnetic field anisotropy orientation, that may be provided in a layer 30. In one embodiment of a thin-ferromagnetic-film layer having Type II easy axis dispersion on a thin-ferromagnetic-film layer 30 of approximately 80% Ni–20% Fe of 0.050 inch in diameter and 2,000 angstroms in thickness that were establishes 25 strips 32 and 25 strips 33 each strip having a varying angular dispersion with respect to the central axis 14 with a maximum angle of approximately 15 degrees at the strips 32, 33 that were farthest removed from such central axis 14. This embodiment, upon readout, generated 50 distinguishable output signals in an inductively coupled printed circuit sense line indicating the storage of 50 distinguishable information states.

Figure 4:
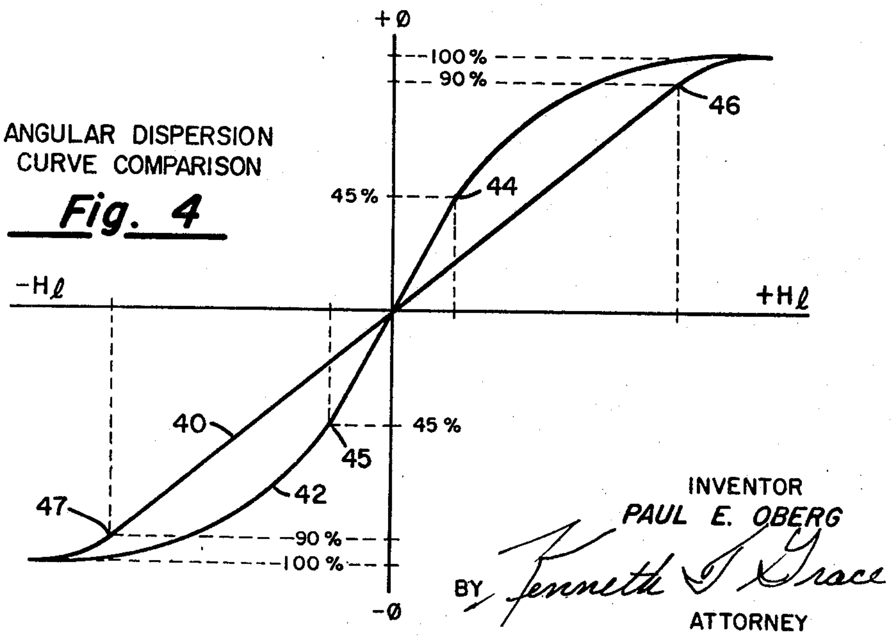
FIG. 4 is a composite illustration of the angular dispersion curves of thin-ferromagnetic-film layers having dispersion characteristics of the prior art and of the present invention.

With particular reference to FIG. 4 there is presented a composite illustration of angular dispersion curves of thin-ferromagnetic-film layers of the prior art and of the present invention. FIG. 4 is a plot of the irreversibly switched magnetization $\phi$ versus applied longitudinal drive field $H_l$ intensity of two thin-ferromagnetic-film layers such as the prior art film layer 10 of FIG. 1 providing the curve 42 and of layers 20 or 30 of FIG. 2 or of FIG. 3, respectively, providing the curve 40 of the present invention. Curves 40, 42 are obtained by the application of a strong transverse drive field $H_t$ thereto, i.e., orthogonal to easy axis 14 or parallel to hard axis 16, so as to rotate the layer's magnetization into a position along its hard axis 16; applying a longitudinal drive field $H_l$ thereto of an increasingly positive or negative intensity, which longitudinal drive field rotates the layer's magnetization from said transverse orientation an angular degree from said hard axis that is a function of the conjoint action of the transverse and longitudinal drive field intensities; then removing the transverse drive field to permit the layer's magnetization to collapse about the easy axis; and then reading out the amplitude of the partially switched flux level of the layer's magnetization and plotting such amplitude versus the intensity of the applied longitudinal drive field.

Upon inspection of FIG. 4 it is apparent that curve 42 has a substantially linear portion within the limits defined by points 44, 45 which limits define the maximum negative and positive intensities of the longitudinal drive field that may be applied to layer 10 of FIG. 1 to achieve a correspondingly linear relationship between the intensity of the applied longitudinal drive field and the partially switched flux level of layer 10. These limits, points 44, 45, span approximately 45 percent of the irreversibly switchable magnetization of layer 10 defining the maximum intensity of the longitudinal drive field, i.e., the analog signal that is to be sampled, that may be coupled to layer 10 while still providing a linear relationship of the applied longitudinal drive field and the correspondingly linearly switched flux thereof.

In contrast to the angular dispersion curve 42 of the prior art layer 10, the present invention, as exemplified by the Type I and Type II easy axis dispersion characteristics of FIG. 2 and FIG. 3, respectively, provides the angular dispersion curve 40. Upon inspection of FIG. 4 it is apparent that curve 40 has a substantially linear portion between limits defined by points 46, 47 which limits define the maximum negative and positive intensities of the longitudinal drive field that may be applied to layers 20, 30 to achieve a correspondingly linear relationship between the intensity of the applied longitudinal drive field and a partially switched flux level of layers 20, 30. Points 46, 47 represent a span of approximately 90 percent of the total irreversibly switchable flux of layers 20, 30 which in comparison to the approximately 45 percent of the irreversibly switchable flux permitted by the prior art layer 10 provides a magnetizable element permitting the switching of twice the irreversible switchable magnetization provided by the prior art. Correspondingly, this linear range of the angular dispersion curve 40 of the present invention as compared to the angular dispersion curve 42 of the prior art permits the sampling of an analog signal of over 4 times the intensity of that that could be utilized by an analog detector incorporating the prior art layer 10 of FIG. 1. Thus, although the layers 20, 30 of the present invention may be of the same physical dimensions as the layer 10 of the prior art the layers 20, 30 of the present invention provide the capability of sampling the intensity of a longitudinal drive field provided by an unknown intensity analog signal of approximately 4 times the permissible range provided by the prior art arrangement.

With particular reference to FIG. 5 there is provided an illustration of one method of generating thin-ferromagnetic-film layers having the Type I dispersion characteristic of the present invention. This arrangement is that of my copending patent application, now Patent No. 3,406,659, in which there is provided a mask 50 having an aperture 52 for defining the planar contour of the thin-ferromagnetic-film layer 54 upon a substrate 56 when utilized in a vapor deposition system. This arrangement includes a glass substrate 56, magnetizable strips 60, 61 for providing the local orienting field in the area of thin-ferromagnetic-film layer 54 and a nonmagnetizable mask 50. Opposing edges of strips 60, 61 are provided with particular contours 62, 63, respectively, in the area of aperture 52 in mask 50 for providing a radial field as the local orienting field in the area of thin-ferromagnetic-film layer 54. In particular there is illustrated the radial orienting field 66 flowing from the circular contour surface 63 of magnetizable strip 61 to the circular contour surface 62 on the opposing edge of the magnetizable strip 60. In this embodiment surfaces 62, 63 are concentric circles whereby the orienting field 66 is a true radial field emanating from surface 63 across thin-ferromagnetic-film layer 54 and into surface 62 of strip 60. This arrangement provides in thin-ferromagnetic-film layer 54 a constantly varying angular dispersion whereby there might be achieved a thin-ferromagnetic-film layer having an angular dispersion curve 40 that is substantially linear over 90 percent of the total irreversibly switchable flux.

With particular reference to FIG. 6 there is provided an illustration of a cross section of the arrangement of FIG. 5 taken along axis 6—6 to illustrate the superposed relationship of the elements of FIG. 5. This view particularly illustrates the orientation of substrate 56 and mask 50 with magnetizable strips 60, 61 sandwiched therebetween for providing the orienting field 66 across the thin-ferromagnetic-film layer 54 defined by aperture 52 in mask 50 during its generation in a vapor deposition system.

With particular reference to FIG. 7 there is provided a trimetric illustration of one method of generating thin-ferromagnetic-film layers having the Type II dispersion characteristic of the present invention. In this arrangement the vaporized magnetic particles 70 are provided by a crucible source 72 in a manner exemplified by the S. M. Rubens Patent No. 2,900,282, the entire arrangement being within an evacuatable enclosure as is well known in the art. Immediately above source 72 and preferably centered along a vertical axis 74 there are provided in a superposed manner a movable mask 76 having a slot 78 therethrough directed orthogonal to the direction 80 through which movable mask 76 is directed, mask 82 having a plurality of apertures 84 therethrough for defining the planar contour of the to-be-deposited thin-ferromagnetic-film layers 86 and substrate 88 upon which the to-be-generated thin-ferromagnetic-film layers 86 are to be deposited. Along a rotatable horizontal axis 90 there are provided two coils 92, 93 for providing a DC orienting field in the plane of substrate 88 for establishing the desired large magnetic dispersion exemplified by the Type II easy axis dispersion of FIG. 3. Coils 92, 93, by being mounted in a suitable rotatable yolk rotatable about axis 74, provide in the plane of substrate 86 a DC orienting field of a predeterminably variable angular orientation with respect to the to-be-generated thin-ferromagnetic-film layers 86 on substrate 88.

Operation of the emobdiment of FIG. 7 is as follows. With crucible source 72 providing the desired magnetic particles 70 directed in an upward direction toward the under surface of moving mask 76 and with substrate 88 having been established at the desirable temperature by any suitable heating means, mask 76 is initially positioned with slot 78 immediately under the left hand edge portions of apertures 84*a*, 84*b* and 84*c* in mask 82 with the axis 90 of coils 92, 93 rotated in a clockwise direction, as viewed from above, at an angle of 75 degrees with respect to axis 94 which axis passes through the center of apertures 84*b*, 84*e*, 84*h*. With coils 92, 93 providing the DC orienting field at an angle of 15 degrees to the central axis 14 of the to-be-generated layers 86 on substrate 88, slot 78 is left in this position for a sufficient period of time to form a thin strip of thin-ferromagnetic material along the left hand edges of layers 86*a*, 86*b*, 86*c* which strips may be represented, for purposes of the present invention, as being strips 32*f* of layer 30 of FIG. 3.

After completion of the deposition of the left-most strip 32*f* in each of layers 86*a*, 86*b*, 86*c*, mask 76 is moved in the direction 80 one increment, approximately equal to the width of slot 78, coils 92, 93 are rotated about vertical axis 74 on their axis 90 to a new angle with respect to axis 94 where upon the generation of a new strip similar to strip 32*e* of FIG. 3 is generated. After the deposition of sufficient metallized vapor 70 upon substrate 88 as determined by slot 78 in mask 76, mask 76 is incremented through the dimension provided by apertures 84*a*, 84*b*, 84*c* in mask 82 with the DC orienting field provided by coils 72, 73 rotated from a clockwise to a counterclockwise direction through a total of 30 degrees. The strips 32, 33 of FIG. 3 are generated for the generation of layers 86*d*, 86*e*, 86*f* and layers 86*g*, 86*h*, 86*i* by the same procedure as above with mask 76 moved in an incremental manner in the direction 80 until it exits from under substrate 82 at position 78*a*. At this time the generation of layers 86 is completed, substrate 88 is replaced with a new substrate and mask 76 is moved in a left-wise direction locating slot 78 in the left-most position along the left hand edges of apertures 84*a*, 84*b*, 84*c* in mask 82 in preparation for the generation of a new set of layers 86 upon the new substrate 88.

With particular reference to FIG. 8 there is presented a schematic illustration of the demagnetized magnetic domain orientation of a prior art single average easy axis $M_a$ thin-ferromagnetic-film layer 10 as illustrated in FIG. 1. The operation of layer 10 is as discussed in the above referenced patent application of Robert A. White et al. in which layer 10 is stated as having a single average easy axis $M_a$ oriented parallel to axis 14 along which the remanent magnetization thereof lies when subjected to a saturating drive field $H_l$ of a first or of a second and opposite direction. Layer 10, as is well known in the prior art, consists of a plurality of localized magnetic domain each having its own local easy axis which may or may not be aligned with its average easy axis $M_a$ along axis 14. See the publication, "Ferromagnetic Films," S. M. Rubens, Electro-Technology, September 1963, pp. 114–122*a*. However, all of the localized magnetic domains when affected by a saturating longitudinal drive field $H_l$ are substantially aligned, plus or minus a dispersion angle $\alpha$, along axis 14 providing an average easy axis $M_a$. In the operation of layer 10 is a bistable memory element the plurality of local magnetic domains are assumed to be substantially aligned in a first or a second and opposite direction providing this average easy axis $M_a$ upon which the applied longitudinal and transverse drive fields are assumed to operate in the manner as disclosed in the S. M. Rubens Patent No. 2,900,282.

To establish the magnetization of layer 10 in the demagnetized state schematically illustrated in FIG. 8 it is merely necessary to apply parallel to the plane of layer 10 a sufficiently intense transverse drive field $H_t$ sufficient to rotate the magnetization thereof into alignment with its hard axis 16; $H_t \geq H_k$. Upon the abrupt removal of this transverse drive field the local magnetic domains representing the magnetization of layer 10 collapse in a random manner but biased in a particular first or a second and opposite direction along axis 14 depending upon the angular deviation of each local magnetic domain from the average easy axis $M_a$ parallel to axis 14. The terms "flux density," "flux level," etc., when used herein shall refer to the net external magnetic affect of a given internal magnetic state; e.g., flux density of a demagnetized state shall be considered to be zero or minimum flux density while that of a saturated state shall be considered to be of a maximum flux density of a positive or a negative sense. Thus, with the localized magnetic domains of layer 10 in the random orientation illustrated in FIG. 8 the net external magnetic field is zero or at a minimum; as stated above the plurality of local magnetic domains are randomly oriented due to the local variations in easy axis orientation.

With particular reference to FIG. 9 there is presented a schematic illustration of the demagnetized magnetic domain orientation of a thin-ferromagnetic-film having the Type I or Type II easy axis dispersion characteristic of the present invention. In contrast to the prior art thin-ferromagnetic-film layer 10 of FIG. 1 in its demagnetized magnetic domain orientation illustrated in FIG. 8; thin-ferromagnetic-film layers 20, 30 of the present invention when subject to a sufficiently intense transverse drive field $H_t$ sufficient to rotate the magnetization of such layers along the hard axis 16 the local magnetic domains are biased in a first or a second and opposite direction along axis 14 as determined by the local magnetic domains' constantly angularly varying relationship away from their central axis 14. When such applied transverse drive field $H_t$ rotates the magnetization of such layers 20, 30 along their hard axis 16, 50 percent of the magnetization thereof is biased in a first direction along axis 14 while the other 50 percent of the magnetization thereof is biased in the opposite direction along axis 14. Accordingly, when the strong transverse drive field $H_t$ is abruptly removed the locally biased magnetic domains rotate in their biased direction whereby the magnetization of layers 20, 30 on a first side of axis 14 comes to rest in a first direction along their local axes generally parallel to axis 14 and the magnetization on the second and opposite side of axis 14 comes to rest oriented in a second direction along their local axes generally parallel to axis 14 and generally antiparallel to that of the magnetization on the first side of axis 14. Thus, layers 20, 30 in a demagnetized magnetic state are comprised of substantially two large magnetic domains with a single domain wall separating the two oppositely polarized magnetic domains along the central axis 14.

With particular reference to FIG. 10 and FIG. 11 there are presented schematic illustrations of the magnetic domain orientation of a Type I and of a Type II thin-ferromagnetic-film layer for a stored analog signal representing plus 30 percent of the irreversible switching flux of layer 20 and of layer 30 of FIG. 2 and of FIG. 3, respectively. The magnetic domain orientations of layers 20 and 30 schematically illustrated in FIG. 10 and FIG. 11 may be achieved by the recording technique of the above discussed Robert A. White et al. patent application wherein a predeterminably variable magnetic flux level is established in a magnetizable element which flux level is representative of the amplitude of an incremental portion of an analog signal that is coupled to the magnetizable element as a longitudinal drive field $H_1$ of a first or of a second and opposite direction along central axis 14. In such an arrangement an incremental portion of an analog signal from a first source is gated into the magnetizable element by a strobe pulse from a second source. The analog signal is coupled to the magnetizable element, such as layers 20, 30, as a longitudinal drive field component, the maximum intensity of which is limited to a level well below the switching threshold $NI_0$ of the magnetizable elements 20, 30 such that the analog signal alone is incapable of affecting the flux level thereof.

As stated herein above with particular reference to FIG. 4 this maximum intensity of the coupled analog signal when using layers 20, 30 may be in the order of four times that when utilizing a prior art layer 10 as the magnetizable element. The strobe pulse is coupled to the magnetizable element as a transverse drive field component and has an intensity sufficient to rotate the magnetizable element's magnetization orthogonal to its easy axis 14, i.e., along its hard axis 16. With layers 20, 30 having the easy axis dispersion characteristics schematically illustrated in FIG. 2 and FIG. 3, respectively, the longitudinal drive field $H_1$ component produced by the analog signal biases the magnetizable element's magnetization away axis 16 a degree that is a function of the intensity of the longitudinal drive field.

At the particular time that the analog signal amplitude is to be sampled the strobe pulse generated transverse drive field is removed permitting the analog signal to set the magnetization of the magnetizable element into a discrete level of partial switching which level of partial switching is representative of the amplitude of the analog signal at the time of the removal of the transverse drive field. Different incremental portions of the analog signal, each incremental portion having a different amplitude, or intensity, in the area of layers 20, 30 may be gated into the magnetizable elements by the determination of the particular turn-off time of the strobe pulse establishing the magnetization of each magnetizable elements 20, 30 into a partially switched flux level that is representative of the amplitude of the sampled portion of the analog signal. With an analog signal of an intensity in the area of layers 20, 30 sufficient to bias the magnetization of such layers away from axis 14 a degree representative of the switching of 30 percent of the magnetization of such layers 20, 30 and into a plus 30 percent partially switched flux level, layers 20 and 30 of FIG. 2 and of FIG. 3, respectively, are established into the magnetic domain pattern schematically illustrated in FIG. 10 and FIG. 11, respectively.

With particular reference to FIG. 10 there can be seen that the magnetic domain pattern achieved by layer 20 under such analog recording technique achieves substantially two large magnetic domains separated by a domain wall along a line of constant angular easy axis deviation away from central axis 14 as determined by the varying easy axis orientation achieved by the method of FIG. 5 and schematically illustrated in FIG. 2. In a like manner, layer 30, when subjected to the same analog signal sufficient to achieve a plus 30 percent analog signal storage state, forms two large magnetic domains separated by a domain wall parallel to the central axis 14 which domain wall may be considered to be on the lines separating the like-oriented easy axis strips 32 of FIG. 3.

With particular reference to FIG. 12 there is presented a schematic illustration of the magnetic domain orientation of a magnetic tape having the Type I or Type II easy axis dispersion characteristic of the present invention. This embodiment of the present invention is particularly adapted to the variable area magnetic recording system of the H. L. Daniels et al. Patent No. 2,743,320, and prepared in accordance with my patent application, now Patent No. 3,406,659. In this magnetic recording system the magnetizable surface of magnetic tape 120 is established in two substantially continuous magnetic domains running along opposite edges of tape 120 separated by a domain wall boundary 126. Using the recording and readout technique of this H. L. Daniels et al. patent the narrow and well defined transition between the two large magnetic domains 122 and 124 as defined by magnetic domain wall 126 provides a more efficient recording medium whereby the technique of such patent may be optimized providing a more precise representation upon readout of the written-in signal. With the tape 120 moving in the direction 128 and inductively coupled to a boundary displacement read-write head such as disclosed in the Howard L. Daniels et al. patent there is provided by the present invention an improved apparatus for the storage of analog data on a magnetic tape.

Applicant has in his illustrated embodiments indicated several methods and apparatus for producing in a vacuum deposition environment thin-ferromagnetic-film layers having predetermined varying easy axis distribution for providing layers having a linear dispersion curve over a substantial percentage of their irreversibly switchable magnetization. Accordingly, it is to be appreciated that applicant's inventive concept is not to be limited to the specific embodiments presented but is to extend to any method or apparatus incorporating the inventive concept of the present invention. It is, therefore, understood that suitable modifications may be made in the methods and structures disclosed provided such modifications come within the spirit and scope of the appended claims. Having now, therefore, fully illustrated and described my invention, what I claim to be new and desire to protect by Letters Patent is set forth in the appended claims.

1. A magnetizable element having single domain properties and an angular dispersion curve that is linear over a substantial percentage of its irreversibly switchable magnetization, comprising:

a magnetizable element having a central axis in the plane of the element about which the magnetic field anisotropy orientation is substantially symmetrical and which is substantially angularly constant throughout strips which are parallel to said central axis and which angularly constant magnetic field anisotropy orientation of each strip is substantially varying in adjacent strips.

2. A magnetizable element having single domain properties and an angular dispersion curve that is linear over a substantial percentage of its irreversibly switchable magnetization, comprising:

a magnetizable element having an axis in the plane of the element about which the magnetic field anisotropy orientation is substantially angularly constant throughout strips which are parallel to said axis and which angularly constant magnetic field anisotropy orientation in each strip is substantially increasingly angularly varying in adjacent strips increasing distances from said axis.

References Cited

UNITED STATES PATENTS 3,228,015 1/1966 Miyata et al. ------ 340—174.1

STANLEY M. URYNOWICZ, Jr., Primary Examiner